3,640,957
MONOOXAZOLINE AND OXAZINE CURED
EPOXY RESINS
Donald A. Tomalia and Robert J. Thomas, Midland,
Mich., assignors to The Dow Chemical Company, Midland, Mich.
No Drawing. Filed June 16, 1969, Ser. No. 833,663
Int. Cl. C08g 30/14
U.S. Cl. 260—47 EN    4 Claims

ABSTRACT OF THE DISCLOSURE

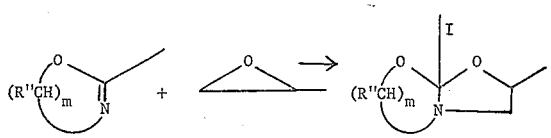

wherein R'' is hydrogen or loweralkyl $C_{1-4}$, $m$ is 2 or 3, and each heterocycle is part of an entire molecule. It is a highly effective curing agent, by both reaction and catalysis, for polyepoxides to obtain epoxy resins.

BACKGROUND OF THE INVENTION

Field of the invention

This invention is concerned with the cure of curable polyepoxides which, upon being cured, are epoxy resins. Various such polyepoxides are commercial products; the cure of this invention cures any of them. Curable mixtures are latent.

Background of the invention and prior art

The curing of polyepoxides to obtain epoxy resins is well known. As one source, see "Handbook of Epoxy Resins" (McGraw-Hill, New York) 2nd edition 1967, by Lee and Neville. It has long been desired to have an essentially one-container mixture of a curable polyepoxide and a curing agent which would remain uncured for prolonged periods of time until heated, whereupon cure would take place promptly. This invention provides such latent cure.

Feinauer and Seeliger, at 698 Liebig's Annallen der Chemie 174 and following teach the reaction of an oxirane with, for example, an oxazoline to obtain a bicyclic structure. In the reaction, one oxazoline or similar structure fuses with one oxirane.

When monooxazoline is supplied to polyepoxide in amounts to meet the stoichiometry of Feinauer et al., the result is a reaction which consumes the polyepoxide oxirane rings but does not yield a cured epoxy resin.

DESCRIPTION OF THE PRESENT INVENTION

According to the present invention we have discovered that the bicyclic adduct of Feinauer et al. is both catalytic and reactive in a curable polyepoxide, moderate to small amounts of such adduct being sufficient to induce catalytic cure of the polyepoxide to an epoxy resin of excellent properties, while itself in some way reacting with and losing its identity in the cured epoxy resin. Moreover, we have discovered that the said bicyclic adduct can be prepared in situ in a curable polyepoxide by simple mixing a desired amount of oxazine or oxazoline compound, here a monooxazine or monooxozoline compound, into the curable polyepoxide. We have also discovered that the oxazine or oxazoline compound in and of itself has no activity that we have ever detected to induce cure of a polyepoxide. We have further discovered that when a mixture of curable polyepoxide and oxazine or oxazoline compound is heated, adduct formation takes place. Heating is characteristically at a temperature above 50° C. and preferably above 100° C. Temperatures above 200° C. offer no advantage, and temperatures much above this temperature are possibly injurious to the intended resins and are to be avoided. Good cures are obtained within reasonable durations of cure time by the employment of temperatures in the range of 100–150° C.

It is essential and critical to this invention that the monooxazine or monooxazoline compound be supplied in quantity that supplies substantially less than one oxazine or oxazoline ring per oxirane ring in the polyepoxide. As noted, the reaction product of a curable polyepoxide with an equivalent amount of monooxazoline or monooxazine compound has any strength as a resin only by accidental etherification cross linking of epoxy molecular structures where, accidentally, the oxazine or oxazoline happened not to react first. Such products are lacking in every property desired in a resin.

As the amount of monooxazoline combined with curable polyepoxide is reduced below that amount which is equivalently stoichiometric, the strength of the resulting resins rises dramatically and continues to increase to a maximum from about 10 to about 40 equivalent percent by weight of curable mixtures. Below about 5 equivalent percent, good resins continue to be formed but curing time becomes longer. No actual lower limit concentration is known, and on the known behaviour of the satisfactory mixtures no lower limit concentration is believed to exist so long as a small, catalytic amount be supplied. However, the supervention of practical considerations, notably acceptable cure durations, and heating temperatures, will usually dictate a lower limit concentration of supplied oxazine or oxazoline in the vicinity of 5 equivalent percent of curable mixture. Above 45 equivalent percent the produced resins are useful for some applications, up to about 49 equivalent percent; but for the best development of strength and other desired properties in a resin, in a cure cycle of reasonable temperature and duration in common with the epoxy curing art, generally, concentrations above about 49 equivalent percent, and even preferably, above about 45 equivalent percent, are to be avoided.

The presence of substituents upon the oxazoline or oxazine compound is unobjectionable. To the extent such substituent is of known reactivity to induce or react with and participate in cure of a polyepoxide to obtain an epoxy resin. that action lies outside the scope of this invention. When the advantages and benefits of this invention in the properties of the finished resin are desired, substituents should be essentially unreactive in the epoxy resin curing system.

A polyepoxide to be cured according to this invention is any of the very many known curable polyepoxides as set forth in the Le and Neville handbook previously mentioned; and include expressly the polyglycidyl ethers of the polyphenols such as the diglycidyl ether of bisphenols A and F; their partially halogenated counterparts such as the diglycidyl ether of tetrabrominated bisphenol A, the epoxylated derivatives of the novolaks such as their reaction products under basic conditions with epichlorohydrin; and the terminally expoxylated polyloweralkylene glycols such as the doubly epoxylated polyethylene and polypropylene glycols.

The cure of this invention depends upon the presence of the oxazine or oxazoline ring structure in a chemical molecule, that chemical substance being intimately mixed into and blended with a curable polyepoxide. Thus virtually any oxazine or oxazoline is useable although this invention is confined to those in which only one oxazine or oxazoline ring appears.

The oxazoline nomenclature is believed to be unambiguous; the compounds are all 2-oxazolines; the oxazine compounds to be employed in this invention are, more precisely, all 5,6-dihydro-4-H-1,3-oxazine compounds and commonly they are substituted on the 2 position. On the 4,5- and 6 positions they may be substituted; but when desirably short cure times of the polyepoxide is an objective to be desired, then substituents on the 4 position are to be avoided, and those on the 6 position are preferable over those on the 5 position.

Similarly, the oxazolines are commonly substituted on the 2 position and can be substituted on the 4 and 5 position; however, as in the oxazines discussed supra, substituents in the 4 position are usually to be avoided.

Within the limits above described, and in view of the Lee and Neville handbook and the Feinauer et al. article mentioned, those skilled in the art are enabled, by this discussion, to practice this invention, making choices in advance if they so desire, of the identity and amount of the monooxazine or monooxazoine compound; of the identity and amount of polyepoxide, and of cure time.

For convenience, it will usually be desired to avoid the oxazine or oxazoline compounds that are extraordinarily flammable or explosive; or those with highly distinct biological activity such as vesicatory or lachrymatory effect, vapour-phase toxicity, and the like. Similarly, other choices of convenience may be made; but they are not essential to this invention.

When it is desired to enjoy maximum benefit of the latency available in a curable composition of this invention, it will be desired to avoid such known epoxy curing moieties as amino, carboxyl, mercapto and the like, and ionic species which are associated with or bonded to some oxazine or oxazoline compounds.

Substituents upon the 2 position of the oxazine or oxazoline ring which can be present without deleterious effect and may be desired for economy and the like include lower alkyl of from 1 to 10, both inclusive, carbon atoms; cycloalkyl of from 3 to 6, both inclusive, carbon atoms; lower alkenyl and lower alkaldienyl and lower alkatrienyl of from 1 to 10, both inclusive, carbon atoms; lower alkoxy of from 1 to 10, both inclusive, carbon atoms; loweralkylol of from 1 to 10, both inclusive, carbon atoms; nitro, furyl, fluoro, chloro, bromo, iodo, trifluoromethyl, chloroloweralkyl and bromoloweralkyl, of $n$ carbon atoms and from 1 to $2n+1$ halogens, $n$ being from 1 to 10, both inclusive; also alkyloxyalkyl and alkylthioalkyl in either of which any alkyl is of from 1 to 10, both inclusive, carbon atoms; loweralkylthio of from 1 to 10, both inclusive, carbon atoms; phenyl, substituted phenyl in which a substituent upon such substituted phenyl is from those above designated there being from 1 to five of such substituents upon said phenyl; and various other moieties not here named.

In the statement of certain individual chemical substances that follows, the abbreviation "mm." uniformly means, "millimeters mercury, pressure, absolute" and is used in conjunction with a number designating the pressure in the indicated units; similarly, various refractive index values are given; they are uniformly to be understood as the refractive index for the D-line of sodium light, and to have been taken with sample and refractometer at a temperature which is, in each instance, specified.

Among the specific oxazine compounds to be used, each of them being understood, as hereinbefore stated, to be a 5,6-dihydro-4H1,3-oxazine, are 2-vinyloxazine, a colourless liquid boiling at 50–59° C. at 20 mm.; 6-methyl6-phenyl-2-vinyloxazine, boiling at 86–86.5° C. under 0.5 mm.; 6-methyl-2-(2-piperidinoethyl)-6-vinyloxazine, boiling at 86–89° C. under 0.02 mm.; 6-methyl-2,6-divinyloxazine boiling at 84–85° C. under 20 mm.; 2-methyloxazine, a colourless liquid boiling at 76–79° C. under 35 mm.; and the corresponding 2-isopropenyloxazoline also a liquid boiling at 81–83° C. under 35 mm.; and the numerous oxazines in the prior art as in the Feinauer et al. articles mentioned.

Among the oxazoline compounds to be employed are 2-methyloxazoline, a colourless liquid with a refractive index at 22° C. of 1.4332; less advantageously, the 2,4-dimethyl oxazoline, boiling at 111.5–112° C. under 748 mm.; 2-ethyloxazoline, colourless liquid with refractive index at 20° of 1.4370; 2,5-dimethyloxazoline; less advantageously, 4,5-dimethyl-2-vinyloxazoline, boiling at 65–66° C. under 35 mm.; 2-propyloxazoline, an article of commerce melting at 148° C.; 2-cyclopropyloxazoline boiling at 66–67° C. under 22 mm.; 2-vinyloxazoline melting at 56.5–57° C. under 50 mm.; 4-methyl-2-vinyloxazoline boiling at 53.5–56° C. under 35 mm.; and preferable to the foregoing, 5-methyl-2-vinyloxazoline boiling at 57° under 35 mm.; also usually disadvantageously, 4,4-dimethyl-2-vinyl or -2-isopropenyloxazoline of U.S. Pat. 2,831,858; 2-isopropenyl-2-oxazoline boiling at 63–64° C. at 35 mm. and found at 5 Angew. Chem. Internat. Edit. vol. 5, 1966, p. 10, a compound conveniently stored under refrigeration; also 2-isopropenyl - 4,5 - dimethyloxazoline boiling at 81° C. under 75 mm.; 5-decyl-2-vinyloxazoline boiling at 50° C. under pressure equivalent to that of 12–17 microns of mercury, absolute; 2-ethoxyoxazoline, boiling at 95–96° C. under 100 mm.; the commercial product 2,4-dimethyl-4-methanoloxazoline; also 2-ethoxy-2-oxazoline; also 2-(2-methoxy-1-methylethyl)oxazoline boiling at 85.5–86° C. at 19 mm.; also 2-(2-(hexyloxy)ethyl)-oxazoline boiling at 94–95° C. at 2.5 mm.; and 2-(ethylthio)oxazoline boiling at 81–89° C. at 5 mm.; also 2-(2-(butylthio)-1-methylethyl)oxazoline, boiling at 96–97° C. at 0.8 mm.; 2-(1-methyl-2-(octylthio)ethyl) oxazoline boiling at 145° C. under 1.2 mm.; also 2-(1-methyl-2-(dodecylthio)ethyl)oxazoline; also 2-(dichloromethyl)oxazoline and 2(trichloromethyl)oxazoline, the latter boiling at 101–105° C. under 20 mm.; similarly 2-(1,1-dichloroethyl) and 2-(1,1-dichloropropyl) oxazoline, the latter boiling at 63–67° C. at 0.06 mm. and also 2-(1,1,3-trichloropropyl)-oxazoline which is a yellow liquid at room temperature; also 2-(2-furyl)-oxazoline melting at 78–81° C. from white crystals; and 2-phenyl oxazoline boiling at 119–120° C. at 16.5 mm.; and closely related to the foregoing, 2-(m-tolyl)oxazoline and 2-(p-tolyl) oxazoline the latter melting at 67–70° C.; also 5-methyl-2-phenyl oxazoline boiling at 121–122° C. under 15 mm.; and 2-p-methoxyphenyl)oxazoline; 2 - (p-chlorophenyl) oxazoline melting at 75–79° C., and its o and m isomers; 2-p-fluorophenyloxazoline, melting from white, glistening crystals at 61–64° C.; 2-(m-bromophenyl)oxazoline melting at 35–40° C.; and its 2-(p-bromophenyl isomer; also the m, p, and o-2-α,α,α-trifluorotolyl)oxazolines; 2-(p-nitrophenyl)oxazoline and its m and o isomers; 2-styryl oxazoline melting at 52–56° C.; 5,5-dimethyl-2-(3-,4-xylyl)oxazoline boiling at 120–123° C. at 0.5 mm.; also 2-(3,4-dimethoxyphenyl)-oxazoline melting at 64–65° C.; and 5,5-dimethyl - 2 - (3,4,5-trimethoxyphenyl)oxazoline, melting at 85–87° C. with at least incipient decomposition; and less advantageously, 4,4-dimethyl-2-(3-,4,5-trimethoxyphenyl)oxazoline melting at 90–91° C.; and also, 2-(p-methoxyphenyl)-5-phenyl oxazoline melting at 63–65° C.; and 2((3,4-dichlorophenoxy)methyl)oxazoline melting at 74–76° C., as well as many others in the prior art as represented in the synopsis by Wiley and Bennett at 44 Chemical Reviews 447 and following, (1949) here incorporated by reference.

Preparation of the present compounds

The oxazoline and oxazine compounds of this invention are all easily produced by any of a group of synthetic routes all of which pass, advantageously, through a cyano group; in the sense that, at each molecular site where an oxazoline or oxazoline heterocycle is desired, there is provided as a precursor site, a cyano. From such site it is, in general, convenient and easy to go on to the desired heterocycle.

It is not difficult, and in the laboratory work carried out in the completion of the instant invention, it has become routine, to prepare the instant compounds with elegance and high purity. However, it is pointed out that for at least their reactivity as curing agents, such elegance is not required. Mixed starting materials can be used to give mixed products all within the single class, or genus, of such compounds as hereinbefore set forth, and all will function as indicated. The position isomery of substituents (but not within the nuclear structure of the oxazine or oxazoline moieties) may vary widely without impairing the products of this invention.

Many synthetic routes are known by which to provide reactive cyano sites as desired.

As illustrative, when the oxazine or oxazoline is to appear on an aromatic nucleus, a phenyl or substituted phenyl starting material can be caused to react with formaldehyde in the presence of hydrochloric acid, to obtain a ring-chloromethylated product. Ring isomery may be controlled, or ignored. This product can then be caused to react with potassium cyanide in a routine metathesis to obtain a cyano site replacing the α-chlorine upon the chloromethylated sites. From such cyano sites, further synthesis of the instant oxazolines and oxazines is routine, as is shown below.

In other procedures, a starting aromatic compound can initially carry an aromatic hydroxyl group at a site of subsequent reaction.

Such material can be condensed with an aliphatic cyano compound, in routine cyanoalkylation, to obtain, at a former hydroxyl site, a cyano alkyl ether structure that is then ready, as cyano compounds in general are, for further use in this invention.

Aliphatic oxazoline-bearing structures are equally readily prepared. Acrylonitrile is immediately available and is representative, as are the large number of other aliphatic cyano compounds.

The cyano compounds are well reviewed at 42 Chemical Reviews 189 by Mowery, through page 283 of which is here incorporated by reference.

From the cyano compound which in some structures can be classified as a nitrile, various routes to the instant oxazoline or oxazine structures are available. Each involves a first acyclic substitution at the cyano site followed by a cyclizing reaction. Whether the resulting heterocycle is an oxazoline (5-membered) or oxazine (6-membered) ring will be determined by the chain length and structure of the acyclic substituent and is in each case entirely optional with the synthesis chemist. In many applications where the sole criterion to be met is that according to this invention there be provided a superior curing agent for an epoxy resin, mixtures of oxazolines and oxazines will be as satisfactory as, or in some applications, more satisfactory than, compounds of high individual purity.

The most forthright route, procedurally, involves reactions of a mechanism which, when set out in detail, appears complicated; but procedures remain simple. This route involves causing a reaction of the cyano compound precursor with a lower alkylene chlorohydrin in the presence of hydrogen chloride, and upon the completion of that reaction, cyclizing the resulting intermediate with a substance, usually a base, which is an acceptor for the elements of hydrogen halide, such as triethylamine, trimethylamine, or an alkali metal hydroxide. With ethylene chlorohydrin (2-chloroethanol) this procedure leads to the oxazolines whilst with trimethylene chlorohydrin, (3-chloro-1-propanol) it leads to the oxazines: and with a mixture of chlorohydrins, a mixture of heterocycles.

Alternative to the foregoing, yet starting from the cyano structure, a group of related synthetic routes proceeds by a first oxidation of the cyano to the carboxyl, as in the presence of sulfuric acid and underprotonating conditions. Upon completion of the conversion to the carboxyl form, the resulting intermediate is then converted to the acyl halide, such as the chloride; in one convenient method this conversion is brought about by reaction of the carboxyl compound with thionyl chloride. Acyl halides other than the chloride are available; and can be used.

From the acyl halide form, various optional routes proceed. The acyl chloride reacts readily with aziridine (ethyleneimine) to obtain an intermediate which, in turn, in the presence of basic hydrogen chloride acceptor, cyclizes to the desired oxazoline structure.

Similarly, azetidines are used. The unsubstituted material is not well known to the present inventors, but numerous azetidines in which the heterocyclic ring has been stabilized by substituents give good results. In general, substituents on the carbon atoms of azetidines appear in the final oxazine products as substituents upon the corresponding carbon atoms.

From the acyl halide, another synthetic route requires reaction of the acyl halide with an amino alcohol, to produce an acyclic intermediate which, from the amino alcohol, is hydroxyl terminated and which, under moderat conditions of dehydration, gives the desired cyclic compound. The identity of the cyclic compound is determined by the number of linear carbon atoms between the hydroxyl and the amino groups. If two, the product is an oxazoline. If three, the product is an oxazine: if a mixture, a mixed product results.

The foregoing represent the prime synthetic routes to substances to be used in the instant invention.

The cyclizing reactions in which precursor substances are converted into the oxazoline compounds of the present invention are, in general exothermic and, in general, they do not require extreme conditions to be initiated. As such cyclizing reactions go forward, there is at least some tendency for competing reactions to take place in which, in a manner that has not been fully studied, polymeric substances appear to be formed. Such polymeric substances tend to be gummy or weakly resinous substances and are not desired. Higher temperatures favor the production of such polymeric substances, and, accordingly, it will oftentimes be desired to maintain reaction temperatures as low as is convenient. Accordingly, the addition of cyclizing agent will oftentimes be carried out slowly, portionwise, and with the resulting reaction mixture cooled or chilled.

Good results are usually obtained when the cyclizing reaction according to the present invention is carried out at a temperature between $-30°$ C. and $+40°$ C. Within this range, at or beyond the lower limit, the cyclizing reaction goes forward very slowly; above the upper limit competing and probably polymerizing reactions go forward at such rate as to be wasteful. A preferred temperature range will vary somewhat according to the precise identity of the precursor substance to be cyclized and also according to the identity of the cyclizing agent; but, in general, a cyclizing reaction temperature of 0 to $+10°$ C. will be preferred. When such temperatures are employed, however, it may at times be advantageous to drive the last aspects of the reaction to completion by the application of moderate heat or at least the removal of cooling for a terminal interval of reaction time.

The reaction can be carried out in the absence of liquid reaction medium. However, there is considerable tendency for employed materials, especially very pure materials, to crystallize; in this condition, the orderly procedure of the cyclizing reaction may be inhibited, and it will usually be desired to prevent or diminish crystallization by the addition of some liquid solvent that is inert to the reaction that is taking place, whereby to maintain an entire reaction mixture in the liquid phase until reactions are substantially complete. Solvent can be chosen for such volatility that it is thereafter readily stripped away.

The precise relationship between the amount of reactant to be cyclized and the capacity of the vessel in which cyclization is carried out is not critical. In general, the inventory of starting material and the capacity of the vessel in which cyclization is to be carried out should be such that good, thorough, prompt, and complete agitation, such as stirring, is convenient.

In general, the atmosphere within the vessel in which cyclization takes place is not critical and may be air. It may also be air saturated with vapors of a volatile solvent. When cyclodehydrohalogenating, as in the instance of a chloroalkylamide or chloroalkylamidate skilled chemists will at once recognize that the ambient atmosphere must not be richly supplied with hydrogen halide from outside source, since it would compete in the cyclizing reaction.

The starting amide or amidate compound to be cyclized can be obtained as an article of commerce and supplied as an existing entity to the reaction vessel. Alternatively, and conveniently, when desired, the starting material that is to be cyclized can be prepared in the same vessel in which it is subsequently cyclized, such preparation taking place immediately or shortly prior to the cyclization reaction if desired. The reaction conditions necessary to prepare the chloroalkylamide or amidate or the hydroxyalkylamide are closely similar to those employed in the cyclization, and such in situ preparation may be preferred.

Upon the completion of the synthesis of compound according to this invention, work-up, that is to say, the separation and sufficient purification of the resulting products is not difficult. Most advantageous procedures will be determined upon the basis of the exact preparatory procedures observed. Thus, when hydrogen halide acceptor reacting with the elements of hydrogen halide obtains a water-soluble product, the entire reaction vessel contents can be, if desired, mixed with water and thoroughly stirred to wash the reaction vessel contents; typically, the resulting mixture separates promptly into an aqueous and an organic layer, product being predominantly in the organic layer.

Distillation can be employed to separate and purify product according to this invention, and the bulk of material necessary to be distilled can sometimes be reduced by such prior water washing.

Crude or partially purified product sometimes gives evidence that the desired oxazine or oxazoline is a solid. In such instance, vacuum distillation is often of use in purification of product; but also, it is at times useful to take crude product up in and recrystallize it from solvent. At least in laboratory quantities, ordinary solvents give good results, such as a mixture of four parts diethyl ether and one part acetone by volume. Isopropanol is also at times used with good results to obtain a recrystallized solid product.

The best mode of practicing the present invention

When tested, all the compounds named, foregoing, as all the compounds of the genus of oxazines and oxazolines, function to cure a polyepoxide in accordance with this invention. Any "best mode" must be at least somewhat arbitrary. Hereinafter, the compound 2-ethyl-2- oxazoline was employed. It was chosen as being more readily available than the oxazines and inherently less expensive; free from substituent upon the 4-position of the oxazoline ring, a position which, by steric hindrance and the like tends to retard cure rates. The identity of the sole substituent, here ethyl, was not deemed critical so long as not highly reactive or unduly bulky. As studies of relationship of quantity of concentration of curing agent to properties of the resulting resin were contemplated, and as other compounds had been tested in large numbers, all the instant tests were run with the single 2-ethyl-2-oxazoline.

The polyepoxide was a commercial product, substantially a diglycidyl ether of bisphenol A, stated by the manufacturer to have an epoxy equivalent weight of 186–192 and the middle value of this range, 189, was taken as the equivalent weight in the calculation of equivalent percentages of the ethyloxazoline. The 2-ethyloxazoline was taken to have a molecular weight of 99. Amounts employed were chosen upon this basis.

The chosen quantities of polyepoxide and of ethyloxazoline were placed together in the same vessel and stirred to obtain an intimate mixture, as a very viscous liquid. In this condition, such mixture, held at room temperature, gains in viscosity through "cure" of the polyepoxide to obtain an epoxy resin so slowly as to be essentially imperceptible.

The prepared samples in this embodiment are cured by heating at 150° C. except as otherwise stated. Duration of heating varies with samples.

As the single most revealing property that could be tested, all samples were tested for tensile strength, in a standard test. All samples were tested alike except for those that could not be subjected to the test at all.

Curing agent concentration, cure time, and tensile strength of product are as set forth in Table I. In general, those in which the curing agent is present in more than 50 equivalent percent by weight of curable mixture do not cure enough that they can be tested for tensile strength; below about 5 equivalent percent the tensile strength drops off rapidly. Between these two values, however, strengths are good, peaking at about 28 equivalent percent in this instance, the peak being appreciably flattened by longer cure times. It is believed that greatly exaggerated cure times would substantially obviate differences in tensile strengths of cured products, care being taken to avoid thermal degradation. Excellent resins are produced with curing agent present in concentrations of from about 40 to 15 equivalent percent by weight of curable mixture.

TABLE I

| Sample: | Concentration of 2-ethyl-2-oxazoline [1] | Duration of cure at 150° C., hours | Tensile strength of cured resin [2] |
|---|---|---|---|
| A | 50 | 15 | — |
| B | 50 | 20 | — |
| C | 50 | 30 | — |
| D | 50 | 50 | — |
| E | 28 | 15 | 10,000 |
| F | 28 | 20 | 10,700 |
| G | 28 | 30 | 11,500 |
| H | 16 | 15 | 6,000 |
| I | 16 | 20 | 9,800 |
| J | 16 | 30 | 11,400 |
| K | 9 | 20 | 1,800 |
| L | 9 | 30 | 3,500 |
| M | 9 | 50 | 10,100 |
|   |   | Duration of cure at 180° C., hours |   |
| N | 5 | 15 | 8,000 |
| O | 5 | 30 | 10,000 |
| P | 5 | 45 | — |

[1] As equivalent percent of curable mixture.
[2] In pounds per square inch (rounded to nearest hundred).
NOTE: Where a dash (—) appears, the sample was not suitable for the tensile strength test.
In each sample, lithium benzoate, in trace amount concentration, less than 0.002, was present as an accelerator.

The unsubstituted oxazine or oxazoline is also satisfactory as a curing agent. Preferred curing agent concentrations are those between about 40 and about 15 equivalent percent.

We claim:
1. As a mixture that is latent at room temperature but promptly curable when heated, in intimate admixture, a 1,2-polyepoxide that is curable by the action of a curing agent to obtain an epoxy resin, and as curing agent, an epoxy-curing amount of a monooxazine or monooxazoline compound that is an unsubstituted 2-oxazoline or unsubstituted 5,6-dihydro-4H-1,3-oxazine, or either of the foregoing with, as optional substituent upon the 5- or 6-position, alkyl of from 1 to 10, both inclusive, carbon atoms; or any of the same with, as substituent on the 2-position, lower alkyl of from 1 to 10, both inclusive, car- bon atoms; cycloalkyl of from 3 to 6, both inclusive, carbon atoms; lower alkenyl and lower alkadienyl of up to 10, inclusive, carbon atoms; lower alkoxy of from 1 to 10, both inclusive, carbon atoms; loweralkylol of from 1 to 10, both inclusive, carbon atoms; nitro, furyl, fluoro, chloro, bromo, iodo, trifluoromethyl, chloro-loweralkyl and bromoloweralkyl of $n$ carbon atoms and from 1 to $2n+1$ halogens, $n$ being from 1 to 10, both inclusive; also alkyloxyalkyl and alkylthioalkyl in either of which any alkyl is of from 1 to 10, both inclusive, carbon atoms; loweralkylthio of from 1 to 10, both inclusive, carbon atoms; phenyl, substituted phenyl in which a substituent upon such substituted phenyl is from those above designated there being from 1 to five of such substituents upon said phenyl, in which the epoxy-curing amount is not less than one equivalent percent and not more than 49 equivalent percent, by weight of curable mixture.

2. Composition of claim 1 in which the polyepoxide is substantially the diglycidyl ether of bisphenol A; and the curing agent is 2-ethyl-2-oxazoline.

3. Process of curing an epoxy resin which comprises the step of combining, intimately, to obtain a curable mixture, a 1,2-polyepoxide that is curable by the action of a curing agent to obtain an epoxy resin, and as curing agent, an epoxy-curing amount of a mono-2-oxazoline compound or unsubstituted 5,6-dihydro-4H-1,3-oxazine, or either of the foregoing with, as optional substituent upon the 5- or 6-position, alkyl of from 1 to 10, both inclusive, carbon atoms; or any of the same with, as substituent on the 2-position, lower alkyl of from 1 to 10, both inclusive, carbon atoms; cycloalkyl of from 3 to 6, both inclusive, carbon atoms; lower alkenyl and lower alkadienyl of up to 10, inclusive, carbon atoms; lower alkoxy of from 1 to 10, both inclusive carbon atoms; loweralkylol of from 1 to 10, both inclusive carbon atoms; nitro, furyl, fluoro, chloro, bromo, iodo, trifluoromethyl, chloroloweralkyl and bromoloweralkyl of $n$ carbon atoms and from 1 to $2n+1$ halogens, $n$ being from 1 to 10, both inclusive; also alkyloxyalkyl and alkylthioalkyl in either of which any alkyl is of from 1 to 10, both inclusive, carbon atoms; loweralkylthio of from 1 to 10, both inclusive, carbon atoms; phenyl, substituted phenyl in which a substituent upon such substituted phenyl is from those above designated, there being from 1 to five of such substituents upon said phenyl: and thereafter heating the resulting mixture at an epoxy curing temperature for an epoxy curing period of time:

the epoxy-curing amount being not less than one equivalent percent and not more than 49 equivalent percent, by weight of curable mixtures.

4. Process of claim 3 in which the polyepoxide is substantially the diglycidyl ether of bisphenol A and the curing agent is 2-ethyl-2-oxazoline and said curing agent is present in a concentration of from 40 to 15 equivalent percent.

References Cited

UNITED STATES PATENTS 3,313,741   4/1967   Uelzmann et al. __ 260—2 EpA

WILLIAM H. SHORT, Primary Examiner

T. E. PERTILLA, Assistant Examiner

U.S. Cl. X.R.

260—2 N, 59 R